US008990956B2

(12) United States Patent
Leber (10) Patent No.: US 8,990,956 B2
(45) Date of Patent: Mar. 24, 2015

(54) SYSTEMS AND METHODS OF EXCHANGING INFORMATION FOR A REWARD (75) Inventor: Mike Leber, Fremont, CA (US)

(73) Assignee: Hurricane Electric, Fremont, CA (US)

(*) Notice: Subject to any disclaimer, the term of this patent is extended or adjusted under 35 U.S.C. 154(b) by 0 days.

(21) Appl. No.: 13/567,844

(22) Filed: Aug. 6, 2012

(65) Prior Publication Data
US 2014/0041015 A1 Feb. 6, 2014

(51) Int. Cl.
H04L 29/06 (2006.01)

(52) U.S. Cl.
USPC ............................................ 726/27; 713/182

(58) Field of Classification Search
USPC ....................................................... 726/27
See application file for complete search history.

(56) References Cited

U.S. PATENT DOCUMENTS

| | | | |
|---|---|---|---|
| 5,774,869 A * | 6/1998 | Toader | 705/14.19 |
| 6,532,450 B1 | 3/2003 | Brown et al. | |
| 6,708,219 B1 | 3/2004 | Borella et al. | |
| 6,757,255 B1 | 6/2004 | Aoki et al. | |
| 7,644,171 B2 | 1/2010 | Sturniolo et al. | |
| 8,402,153 B2 | 3/2013 | Friedman | |
| 2002/0012320 A1 | 1/2002 | Ogier et al. | |
| 2003/0135461 A1 | 7/2003 | Brown et al. | |
| 2004/0133463 A1 * | 7/2004 | Benderev | 705/10 |
| 2005/0055319 A1 | 3/2005 | Monsen et al. | |
| 2005/0071219 A1 * | 3/2005 | Kahlert et al. | 705/10 |
| 2005/0273438 A1 * | 12/2005 | Yen et al. | 705/59 |
| 2006/0224509 A1 * | 10/2006 | Walker et al. | 705/40 |
| 2006/0256716 A1 | 11/2006 | Caci | |
| 2007/0162746 A1 | 7/2007 | Kwon et al. | |
| 2008/0109278 A1 * | 5/2008 | Rao | 705/7 |
| 2008/0162315 A1 * | 7/2008 | Rampell et al. | 705/35 |
| 2008/0162350 A1 | 7/2008 | Allen-Rouman et al. | |
| 2009/0016253 A1 | 1/2009 | Lewis et al. | |
| 2009/0037277 A1 * | 2/2009 | Zuckerberg et al. | 705/14 |
| 2009/0199070 A1 | 8/2009 | Haymes et al. | |
| 2009/0248800 A1 | 10/2009 | Chu et al. | |
| 2009/0254984 A1 | 10/2009 | Nice et al. | |
| 2010/0077095 A1 * | 3/2010 | Wong et al. | 709/231 |
| 2010/0312702 A1 | 12/2010 | Bullock | |
| 2011/0022711 A1 | 1/2011 | Cohn | |
| 2011/0023105 A1 | 1/2011 | Islam et al. | |
| 2011/0154319 A1 | 6/2011 | Carter-Schwendler et al. | |
| 2011/0206043 A1 | 8/2011 | Williams | |
| 2011/0302408 A1 | 12/2011 | McDermott et al. | |
| 2012/0089471 A1 | 4/2012 | Comparelli | |
| 2012/0140018 A1 | 6/2012 | Pikin et al. | |
| 2012/0203697 A1 | 8/2012 | Morgan et al. | |
| 2012/0215690 A1 | 8/2012 | Grinberg et al. | |
| 2012/0290415 A1 | 11/2012 | Itwaru | |
| 2013/0024255 A1 * | 1/2013 | Mittereder et al. | 705/14.17 |
| 2013/0080618 A1 | 3/2013 | Balwani | |
| 2013/0111002 A1 | 5/2013 | Leber | |
| 2013/0218768 A1 | 8/2013 | Leber | |
| 2014/0006281 A1 | 1/2014 | Leber | |

* cited by examiner

Primary Examiner — Yogesh Paliwal
(74) Attorney, Agent, or Firm — Carr & Ferrell LLP (57) ABSTRACT Systems and methods for exchanging information for access to a computing resource are provided herein. Methods may include receiving a request to access a computing resource, the computing resource being selectively unavailable to the information provider, responsive to receiving the request, providing the information provider a problem that is to be solved by the information provider prior to making the computing resource selectively available to the information provider, wherein solving the problem elicits desired information from the information provider, and responsive to receiving the desired information, selectively making the computing resource available to the information provider.

18 Claims, 4 Drawing Sheets

SYSTEMS AND METHODS OF EXCHANGING INFORMATION FOR A REWARD

FIELD OF THE TECHNOLOGY

Embodiments of the disclosure relate to exchanging information for a reward. More specifically, but not by way of limitation, the present technology may be utilized to exchange information for a reward. Exemplary embodiments contemplate providing access to a computing resource such as a program or the Internet in exchange for information from an information provider.

BACKGROUND OF THE DISCLOSURE

Commonly utilized methods for exchanging information on the Internet often rely on mediums such as user forums and question/answer websites where individuals may post questions and receive answers from the community of users. Additionally, educational websites that provide knowledge are also well known, but participation may remain low due to a lack of entertainment value provided to the end user.

SUMMARY OF THE DISCLOSURE

According to some embodiments, the present technology may be directed to methods of exchanging information for access to a computing resource. The methods may comprise: (a) receiving a request to access a computing resource, the computing resource being selectively unavailable to the information provider; (b) responsive to receiving the request, providing the information provider a problem that is to be solved by the information provider prior to making the computing resource selectively available to the information provider, wherein solving the problem elicits desired information from the information provider; and (c) responsive to receiving the desired information, selectively making the computing resource available to the information provider.

According to additional embodiments, the present technology may be directed to systems for exchanging information for access to a computing resource. The systems may comprise: (a) a memory for storing executable instructions; (b) a processor for executing the instructions stored in memory; (c) a request module stored in memory and executable by the processor to receive a request to access a computing resource, the computing resource being selectively unavailable to the information provider; (d) an exchange module stored in memory and executable by the processor that, responsive to receiving the request, provides the information provider a problem that is to be solved by the information provider prior to making the computing resource selectively available to the information provider, wherein solving the problem elicits desired information from the information provider; and (e) a fulfillment module stored in memory and executable by the processor that, responsive to receiving the desired information, selectively makes the computing resource available to the information provider.

According to other embodiments, the present technology may be directed to a method for operating an information exchange that comprises: (a) receiving a problem via an exchange system; (b) providing the problem via the exchange system to a plurality of information providers; (c) receiving, via the exchange system, bids from the plurality of information providers for providing a solution to the problem; (d) receiving, via the exchange system, the solution from a selected information provider; and (e) compensating the information provider in exchange for the solution.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology is directed to systems, methods, and media that facilitate the exchange of information for a reward. Information may be obtained by requiring an information provider (e.g., the party that provides information in exchange for a reward) to solve a problem. A problem will be understood to include the completion of an action, the completion of a survey, responding to a poll, viewing media and answering questions regarding the media, as well as other similar tasks that are designed to elicit information from an information provider that would be known to one of ordinary skill in the art with the present disclosure before them.

In some instances, information requesters may post problems to an exchange system. In response, information providers may place bids to provide solutions to the posted problems. In some instances, information requesters may select from a list of information providers that have bid upon the problem. Once the information provider has provided a suitable solution to the problem, the exchange system may facilitate compensation of the information provider.

In exchange for information, an information requester (e.g., a party that desires to obtain information from an information provider) may provide the information provider with a reward. That is, in response to the information provider solving the required problem, the present technology may provide a reward. In some instances, the reward may include virtual or actual currency, redeemable points/credits, and/or access to a computing resource. Access to a computing resource may comprise gaining access to a computer program or to the Internet. Additionally, rewards may also be provided to the information requester and/or the information exchange facilitator (e.g., a party that acts as an information proxy between the information requester and the information provider).

The provision of rewards (such as access to a computing resource) may increase the likelihood that the information provider will participate in the exchange of information. Non-limiting use cases for implementing the present technology include a website that selectively provides access to content, such as media, when the end user (information provider) solves a series of problems. Other examples include a captive portal or public WiFi system that provides access to the Internet when the end user solves a problem such as completing a survey. Additionally, a kiosk or end user terminal may be accessed by inputting a screen saver password. The password may be provided upon an information provider solving a problem. Similarly, a plugin for a web browser may selectively provide access to a website or the Internet only upon the end user solving a series of problems.

The present technology may also function as an access limiting or education enhancing system. For example, an end user may only gain access to a computing resource (either a computing device, a program that executes on the device, or a resource available to the computing device, etc.) when the end user solves a series of educational problems.

The present technology may also employ techniques that enhance or optimize the problems provided to the information providers. For example, the present technology may apply demographic and/or psychographic information to create or optimize problems that are more likely to result in the exchange of information between information providers and requesters. These and other advantages of the present technology will be described in greater detail with reference to the collective FIGS. 1-4.

Figure 1:
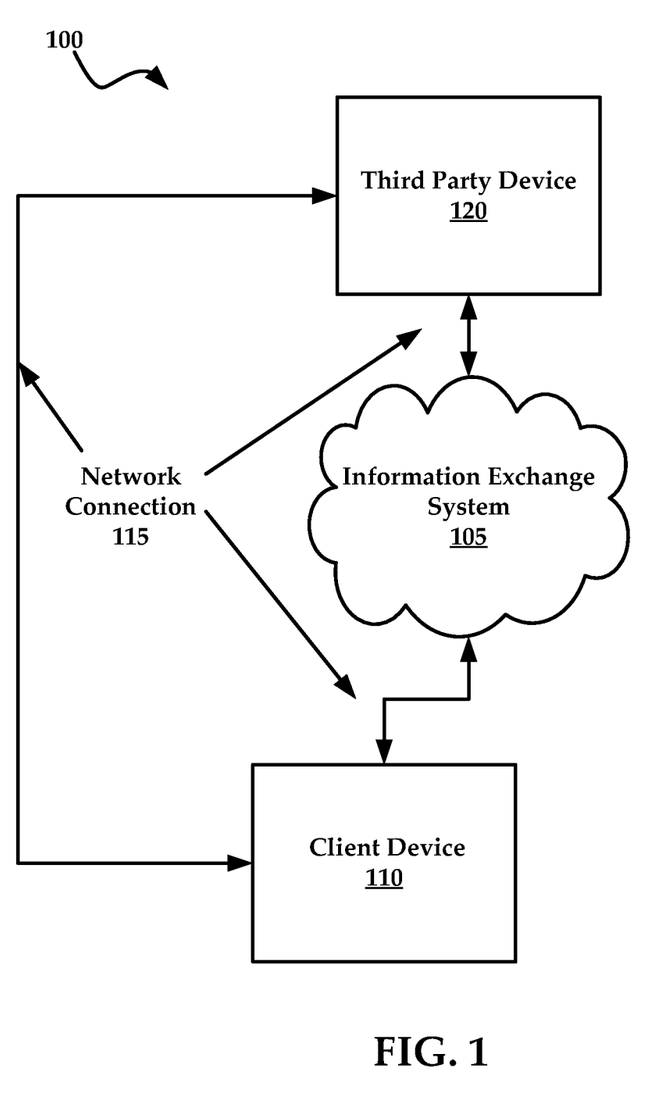
FIG. 1 illustrates an exemplary system for practicing aspects of the present technology.

FIG. 1 illustrates an exemplary system 100 for practicing aspects of the present technology. The system 100 may include an information exchange system, hereinafter "system 105" that may be implemented in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the system 105 may include a distributed group of computing devices such as web servers that do not share computing resources or workload. Additionally, the system 105 may include a single computing device that has been provisioned with a plurality of programs.

End users (e.g., information providers) may exchange information for rewards with the system 105 via individual client devices 110. The system 105 may communicatively couple with client device 110 via a network connection 115.

The network connection 115 may include any one of a number of private and public communications mediums such as the Internet.

In some instances, the system 105 may act as an information proxy between the client device 110 and a computing resource such as a website, program, or computing resource accessible by a third party device 120. That is, to be granted access to the computing resource of the third party device 120 the end user may be required to solve problems in exchange for access to the computing resource. The system 105 and the third party device 120 may also communicate via the network connection 115, which may comprise any one of a number of secure/insecure communications protocols.

The system 105 may be generally described as a system that facilitates the exchange of information between information providers and information requesters. The exchange of information may occur when information providers solve problems that are designed to elicit particular types of information. The system 105 exchanges this elicited information for a reward. In some instances rewards may be provided to the information provider and/or the information requester. That is, the information requester may be provided a reward for providing a valuable problem (e.g., a problem that elicited a prompt solution, or a survey where all questions were answered, etc.).

In other embodiments, the system 105 may not be required. That is, the present technology may be implemented as executable instructions that are executable on a computing device such as the end user client device 110. The execution of the instructions on the client device 110 causes the client device 110 to act as a particular purpose computing system that exchanges information for access to computing resources.

Figure 2:
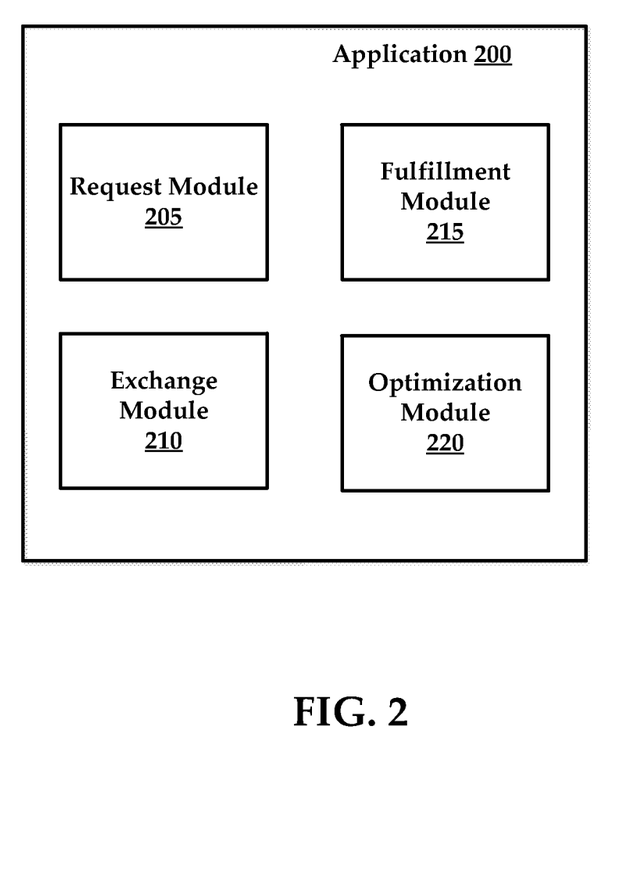
FIG. 2 illustrates an exemplary conversion application for exchanging information.

Referring now to FIG. 2, the executable instructions may be embodied as an application 200 that causes the associated computing device (such as system 105, client device 110, and/or third party device 120) to facilitate the exchange of information for rewards, such as access to a computing resource.

Advantageously, the application 200 may be utilized in conjunction with the system 105 in instances where an information proxy facilitates the exchange of information between information providers and requesters. Alternatively, application 200 may reside on the client device 110 of the information provider. The application may be embodied as a browser plugin or program that executes on the client device 110 to cause the exchange of information for a reward. By way of non-limiting example, the application 200 may be executed to run in the background of the client device 110 and may selectively grant/deny access to particular computing resources on the client device 110 such as a videogame or the Internet. The application 200 may also selectively grant/deny access even to the client device 110. In some instances, the application 200 may be configured to provide the end user with a series of educational problems that are to be answered before the end user is allowed to play the videogame. In other instances the application 200 may be installed as a browser plugin that provides selective connectivity with websites or the Internet in response to the end user completing a task.

The term "computing resource" may be understood to include not only a physical computing device such as a computer, mobile telephone, laptop, or computing kiosk, but also executable instructions that are stored in memory and executed by the processor of a computing device, along with any other hardware, software, or communications medium available via the computing device such as a network connection to the Internet.

Generally speaking, the application 200 may generally comprise a request module 205, an exchange module 210, a fulfillment module 215, and a task optimization module 220. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules/engines/generators of the application 200 may include separately configured web servers.

For the purposes of clarity, the following description will encompass a use case where the application 200 is resident within an entity device (such as third party device 120 of FIG. 1) such as a web server that comprises a wireless router that couples the web server to the Internet. The web server may provide Internet access using a captive portal interface. Generally speaking, when an end user desires to access a computing resource such as the Internet at an entity device (e.g., WiFi hotspot) operated by another entity, the web server may employ captive portal technologies. A captive portal redirects all initial incoming requests for WiFi services to a specific landing page. The landing page may prompt payment for the WiFi services or may include a privacy policy that must be accepted by the end user prior to providing Internet access to the end user client device 110.

In sum, the captive portal ensures that the computing resource (the Internet) is selectively unavailable to the end user until the end user complies with the requirements established by the entity.

In accordance with the present technology, application 200 may be executed to await requests to connect to the Internet from client devices 110. Again, initially the Internet is selectively unavailable to the end user client device 110. The request module 205 may receive a request from the end user client device 110 when the client device 110 establishes a wireless connection with the entity device and a browser application executing on the client device 110 attempts to connect to the Internet to retrieve a webpage.

The exchange module 210 may then be executed to provide a problem to the client device 110. Rather than (or in addition to) simply providing the end user with captive portal payment options or requiring the end user to accept a usage/privacy policy, the exchange module 210 may provide the client device 110 with a problem that is to be solved before making the computing resource selectively available to the client device 110. As mentioned earlier, the problem may include, participating in a survey or a poll, watching media and answering questions regarding the media, along with other tasks that are designed to elicit information from information providers, such as end users of the client device 110. In some instances, the information that is elicited from the end user may be provided to obtain preference information regarding a product or service offered by an entity. Thus, the information elicited during the solving of the problem goes beyond eliciting information commonly required to access the computing resource, such as providing a password, asking if the end user read the privacy policy, and so forth. Stated otherwise, the information that is elicited from the end user may not relate to the computing resource itself. As such, the task provided to the end user may be designed to elicit information that may be utilized by a third party in the marketing/advertising of a product or service.

Once the end user has solved the problem, the fulfillment module 215 may be executed to make the computing resource selectively available to the information provider (e.g., end user) via their client device 110. The fulfillment module 215 may establish a network connection allowing the client device 110 to access the Internet via the entity device (e.g., wireless router).

According to some embodiments, the fulfillment module 215 may make the computing resource selectively available for a predetermined amount of time. That is, the fulfillment module 215 may facilitate the network connection for a period of time. At the expiration of the timeframe, the fulfillment module 215 may make the computing resource selectively unavailable again. The exchange module 210 may provide the end user with another problem that should be solved/completed prior to the fulfillment module 215 making the computing resource selectively available again. As such, the exchange module 210 and the fulfillment module 215 may cooperate with one another to periodically provide the end user with problems in exchange for selective access to a computing resource.

The operator of the entity device may establish how often problems are to be required and the time frame that the computing resource is to be made selectively available.

In addition to providing access to computing resources, the fulfillment module 215 may be configured to provide a reward to the information requester (e.g., entities that desire to obtain information), the information provider, and/or the entity that provides a computing device (e.g., the entity device described above) that utilizes the application 200 either directly or indirectly. For example, a movie studio (information requester) may desire to elicit information from end users (information provider) who desire Internet access at a WiFi portal (entity device). The fulfillment module 215 may provide rewards to each party that participates in the exchange of information for computing resources.

These rewards may include physical and/or virtual rewards such as credits, currency (both actual and virtual), coupons, prizes, and other rewards that would be known to one of ordinary skill in the art. The rewards may be utilized in a variety of ways. For example, the movie studio may accrue credits that allow the studio to provide problems (such as video clips and surveys regarding the video clips) to end users at a reduced rate. The WiFi portal operator may also receive monetary compensation from the movie studio for each trailer video that is watched and a corresponding survey which is successfully completed.

Rewards may also be provided to information requesters that generate problems that result in participation by the end user. That is, information requesters may be rewarded for generating problems that end users are enthusiastic about completing. For example, it may be inferred that a problem that always (or nearly always) results in completion is more valuable than a problem that is rarely completed. Problems that are always completed may be utilized as the basis for optimizing future problems, as will be described in greater detail below.

According to some embodiments, during the exchange of information, the optimization module 220 may be executed to analyze and/or optimize the problems that are provided to the information providers. Using the above example, the optimization module 220 may determine information such as the number of times the video trailer was watched completely, along with the number of times the video trailer was stopped before completion. The optimization module 220 may also evaluate the survey questions to determine the questions that elicited the most responses. Each of the questions may be evaluated individually or in the aggregate, relative to one another.

The optimization module 220 may also obtain and utilize demographic, psychographic, geographic, web analytic, behavioral, or combinations thereof, obtained from information providers that complete tasks. These types of information may be gleaned from answers provided by the information providers, but also from data gathered by web analytic capturing and mining methods that would be known to one of ordinary skill in the art.

These various types of feedback or analytics may be provided to the information requester. The information requester may utilize this information to optimize their survey questions, modify their advertisements, and/or modify their products/services. In other embodiments, the optimization module 220 may automatically modify problems based upon the determined information. For example, if the optimization module 220 determines that the same ten problems were solved by each information provider, the optimization module 220 may ensure that future problems include problems that are modeled on these problems.

Additionally, the optimization module 220 may rank each problem based upon the number of times the problem was solved correctly. Problems that were frequently solved may be placed earlier in future exchanges to increase the likelihood of participation, while problems that were rarely solved may result in an earlier failure to solve the problem. Thus, these problems may be placed later in a series.

According to other exemplary use cases, the application 200 may be embodied as a browser plugin that selectively controls access to the Internet by controlling a browser application that executes on a client device 110. When an end user executes the browser application, the browser plugin may be executed to selectively control access to the Internet.

Generally speaking, the browser plugin may be utilized to require the end user to solve a problem before accessing the Internet. The problem may include solving a series of educational problems. For example, parents may install the browser plugin to ensure that their children are not only accessing the Internet but also being intellectually engaged with via the educational problems.

The request module 205 may detect the opening of the browser application and/or the request of a URL via the address bar. Before the fulfillment module 215 selectively provides access to the Internet (or in some instances the requested URL), the exchange module 210 may provide the end user with a series of educational problems. In some instances, the end user may be required to correctly solve an amount of problems within a given time frame. Once the task has been completed, selective access to the computing resource (the Internet) may be established by the fulfillment module 215.

As with the previous example, access to the Internet may be periodically disabled. Additional problems may be provided and require completion before the access to the Internet is restored.

Rather than a browser plugin, the application may be embodied as an application 200 that runs in the background of the client device 110. The application 200 may provide selective access to computing resources such as videogames, telecommunications interfaces, media players, and so forth. A system administrator may specify the programs that are subject to selective access restrictions as well as the problems that are to be solved. The administrator may also establish a problem schedule that determines when problems are provided to the end user and when computing resources are selectively enabled/disabled.

According to some embodiments, the problems may be provided via a display device of a computing device. In other instances the problem may be provided in an audio format.

It will be understood that the present technology is not limited to exchanging information for access to a computing resource, but may also be utilized to exchange information for controlling the actions of a system or apparatus. In some instances, the present technology may be utilized to selectively enable/disable an electric door lock, start the engine of a vehicle, log on to a computing device, dispense a product from a vending machine, and other similar systems/functions that would be known to one of ordinary skill in the art.

According to other embodiments, the present technology may provide an information exchange that allows information requesters to create and post problems to the exchange. Information providers (e.g., problem solvers) may provide bids to the exchange system that indicate how much compensation the information provider requires to provide a solution to the problem.

The present technology may automatically select the lowest bid. In other instances, an information requester may select their desired information provider not only from their bids but also subjective information such as education level, reputation, previous problem/solution pairs, and so forth.

In exchange for a suitable solution to the problem, the present technology may facilitate the compensation of the information provider in accordance with their bid. Compensation may include directly paying the information provider. In other embodiments, compensation may comprise directing a third party to compensate the information provider. For example, the exchange system may send a payment request to a bank when the information provider delivers a suitable solution.

Figure 3:
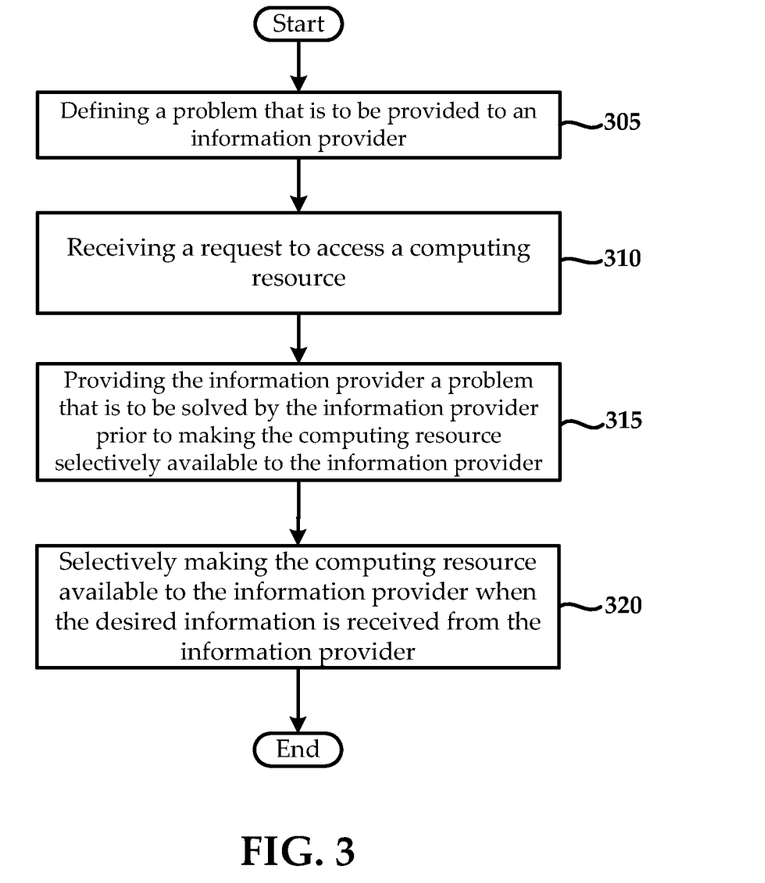
FIG. 3 is a flowchart of an exemplary method of exchanging information for access to a computing resource.

FIG. 3 illustrates a flowchart of an exemplary method of exchanging information for access to computing resources. The method may include a step 305 of defining a problem that is to be provided to an information provider. Additionally, the step 305 may include determining a problem schedule that defines how and when the problems are provided as well as the computing resource that is to be selectively enabled/disabled.

The method may also include a step 310 of receiving a request to access a computing resource. Initially, the computing resource is selectively unavailable to an information provider. Responsive to receiving the request, the method may include a step 315 of providing the information provider a problem that is to be solved by the information provider prior to making the computing resource selectively available to the information provider. It is noteworthy that solving of the problem is designed to elicit desired information from the information provider.

Additionally, the method may include a step 320 of selectively making the computing resource available to the information provider when the desired information is received from the information provider (e.g., when the information provider solves the problem).

Figure 4:
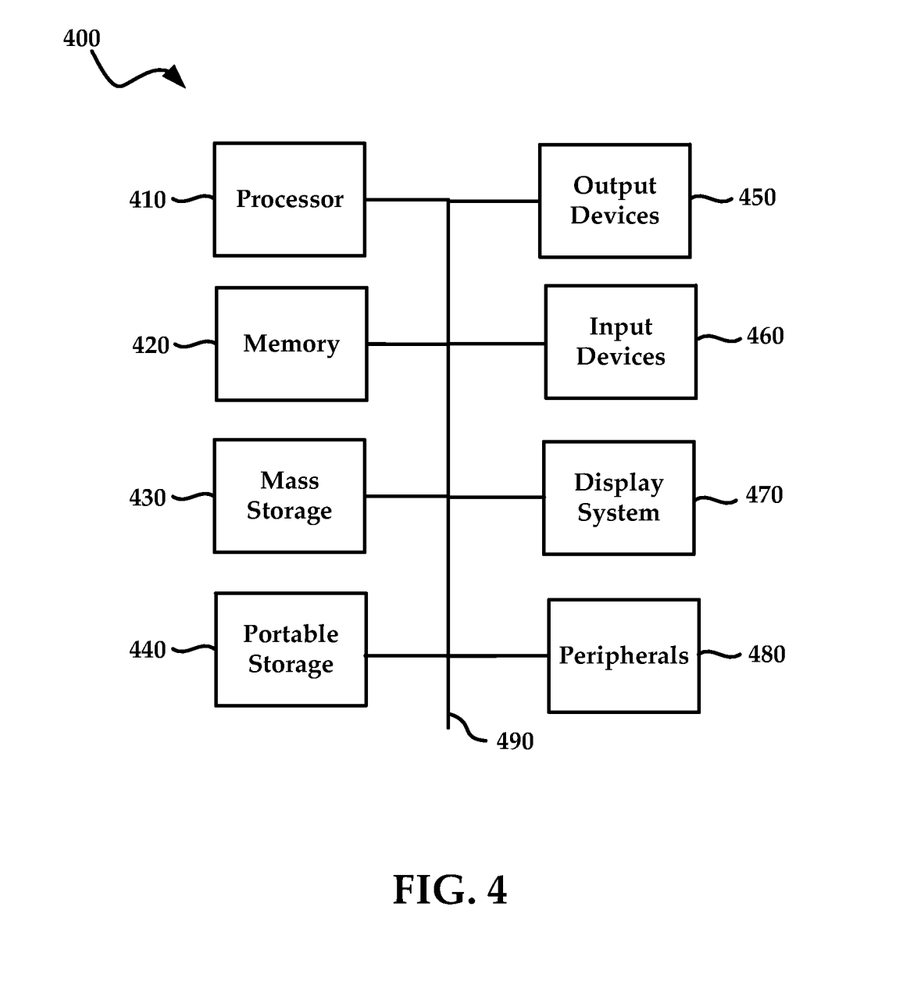
FIG. 4 illustrates an exemplary computing device that may be used to implement embodiments according to the present technology.

FIG. 4 illustrates an exemplary computing device (also referred to as a system) 400 that may be used to implement the various embodiments of the present technology. The computing device 400 of FIG. 4 includes one or more processors 410 and memory 420. Memory 420 stores, in part, instructions and data for execution by processor (also referred to as a processor unit) 410. Memory 420 can store the executable code when computing device 400 is in operation. Computing device 400 of FIG. 4 may further include a mass storage 430, portable storage (also referred to as a medium, drive and/or medium drive) 440, output devices 450, user input devices 460, a display system (also referred to as a graphics display 470, and other peripherals (also referred to as peripheral devices) 480.

The components shown in FIG. 4 are depicted as being connected via a single bus 490. The components may be connected through one or more data transport means. Processor 410 and memory 420 may be connected via a local microprocessor bus, and the mass storage 430, peripherals 480, portable storage 440, and display system 470 may be connected via one or more input/output (I/O) buses.

Mass storage 430, which may be implemented with a magnetic disk drive or an optical disk drive, is a non-volatile storage device for storing data and instructions for use by processor 410. Mass storage 430 can store the system software for implementing embodiments of the present technology for purposes of loading that software into a memory 410.

Portable storage 440 operates in conjunction with a portable non-volatile storage medium, such as a floppy disk, compact disk or digital video disc, to input and output data and code to and from the computing device 400 of FIG. 4. The system software for implementing embodiments of the present technology may be stored on such a portable medium and input to the computing device 400 via the portable storage 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, computing device 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing device. Peripherals 480 may include a modem or a router.

The components contained in the computing device 400 of FIG. 4 are those typically found in computing devices that may be suitable for use with embodiments of the present technology and are intended to represent a broad category of such computer components that are well known in the art. Thus, the computing device 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of exchanging information for access to a computing resource, using a browser plug-in that executes on a client device, the method comprising:
   defining a computing resource that is to be selectively enabled or disabled by the browser plug-in, the browser plug-in being configured to selectively disable the computing resource after a time frame, according to a task schedule that determines when problems are to be presented to a user and time frames when the computing resource is selectively enabled or disabled;
   receiving a request to access the computing resource, the computing resource comprising one of a computing device, a videogame, an Internet connection and a program executable on the computing device, the computing resource being selectively unavailable to an information provider;
   responsive to receiving the request, providing the information provider a problem that is to be solved by the information provider prior to making the computing resource selectively available to the information provider, wherein solving the problem elicits desired information from the information provider, further wherein the problem includes a real-world problem;

responsive to receiving the desired information:
selectively providing the information provider with access to the computing resource using the browser plug-in, wherein the browser plug-in is configured to allow selective access to the computing resource;
selectively enabling the computing resource by the browser plug-in; and
selectively disabling the computing resource by the browser plug-in in accordance with the task schedule; and
providing a reward to at least one or more of the information provider, an information requester that provided the problem, an owner of the computing resource, or combinations thereof.

2. The method according to claim 1, further comprising making the computing resource selectively unavailable to the information provider after a predetermined period of time after selectively making the computing resource available to the information provider.

3. The method according to claim 2, further comprising providing the information provider an additional problem that is to be solved by the information provider prior to making the computing resource selectively available to the information provider, the additional problem being designed to elicit desired information from the information provider.

4. The method according to claim 1, wherein providing the information provider the problem further comprises providing the information provider a plurality of problems, wherein the method comprises allowing the information provider to select at least one problem that is to be solved by the information provider prior to making the computing resource selectively available to the information provider, wherein solving the problem elicits desired information from the information provider.

5. The method according to claim 4, further comprising:
tracking selected problems;
evaluating information included in the selected problems that are tracked; and
utilizing the determined information for generating additional problems.

6. The method according to claim 1, wherein content of the problem is generated from at least one or more of demographic, psychographic, geographic, web analytic, behavioral, or combinations thereof, obtained from information providers that solve problems.

7. The method according to claim 1, further comprising receiving problems from a plurality of information requesters, wherein the problem provided to the information provider is selected from the received problems.

8. The method according to claim 1, wherein providing the information provider a problem further comprises providing the information provider with an amount of problems that are to be solved within a predetermined amount of time.

9. The method according to claim 1, wherein the problem includes at least one or more of a product evaluation, an educational activity, providing an answer to a question, viewing media and providing answers to queries regarding the media, or combinations thereof.

10. A system for exchanging information for access to a computing resource, the method comprising:
a memory for storing executable instructions; and
a processor for executing the instructions, the instructions comprising:
a browser plug-in that executes on a client device, the browser plug-in being configured to make selectively unavailable a currently available computing resource after a time frame, according to a task schedule that determines when problems are to be presented to a user and time frames when the computing resource is selectively enabled or disabled;
a fulfillment module stored in memory and executable by the processor that causes the currently available computing resource to be selectively unavailable using the browser plug-in, the browser plug-in being configured to allow selective access to the currently available computing resource;
a request module stored in memory and executable by the processor to receive a request to access the computing resource, the computing resource comprising one of a computing device, a videogame, an internet connection and a program executable on the computing device, the computing resource being selectively unavailable to an information provider by operation of the browser plug-in;
an exchange module stored in memory and executable by the processor that, responsive to receiving the request, provides the information provider a problem that is to be solved by the information provider prior to making the computing resource selectively available to the information provider, wherein solving the problem elicits desired information from the information provider; and
the fulfillment module being responsive to:
receiving the desired information, selectively makes the computing resource available to the information provider using the browser plug-in, the fulfillment module further configured to providing a reward to at least one or more of the information provider, an information requester that provided the problem, an owner of the computing resource, or combinations thereof, wherein the reward includes any of credits, virtual and physical currency, coupons, or prizes; and
selectively disabling the one or more computing resources by the browser plug-in in accordance with the task schedule.

11. The system according to claim 10, wherein the fulfillment module further makes the computing resource selectively unavailable to the information provider after a predetermined period of time after selectively making the computing resource available to the information provider.

12. The system according to claim 11, wherein the exchange module further provides the information provider an additional problem that is to be solved by the information provider prior to making the computing resource selectively available to the information provider, the additional problem being designed to elicit desired information from the information provider.

13. The system according to claim 10, wherein the problem further comprises a plurality of problems, wherein the request module allows the information provider to select at least one problem that is to be solved by the information provider prior to making the computing resource selectively available to the information provider, wherein solving the problem elicits desired information from the information provider.

14. The system according to claim 13, further comprising a problem optimization module that tracks selected problems and evaluates information included in the selected problems that are tracked, wherein the exchange module utilizes the information determined by the problem optimization module to generate additional tasks.

15. The system according to claim 10, wherein content of the problem is generated by the exchange module from at least one or more of demographic, psychographic, geographic, web analytic, behavioral, or combinations thereof, obtained from information providers that solve problems.

16. The system according to claim 10, wherein the request module receives problems from a plurality of information requesters, wherein the problem provided to the information provider by the exchange module is selected from the received problems based on a likelihood of participation by the information provider.

17. The system according to claim 10, wherein the exchange module provides the information provider with an amount of problems that are to be solved within a predetermined amount of time.

18. The system according to claim 10, wherein the problem includes at least one or more of a product evaluation, an educational activity, providing an answer to a question, viewing media and providing answers to queries regarding the media, or combinations thereof.

* * * * *